(12) United States Patent
Yuoka et al.

(10) Patent No.: US 9,273,205 B2
(45) Date of Patent: Mar. 1, 2016

(54) VIBRATION DAMPING MATERIAL

(71) Applicant: KITAGAWA INDUSTRIES CO., LTD., Inazawa-shi, Aichi (JP)

(72) Inventors: Teruaki Yuoka, Inazawa (JP); Takashi Kurachi, Inazawa (JP)

(73) Assignee: KITAGAWA INDUSTRIES CO., LTD., Inazawa-Shi, Aichi (JP)

( * ) Notice: Subject to any disclaimer, the term of this patent is extended or adjusted under 35 U.S.C. 154(b) by 0 days.

(21) Appl. No.: 14/441,269

(22) PCT Filed: Oct. 11, 2013

(86) PCT No.: PCT/JP2013/077797
§ 371 (c)(1),
(2) Date: May 7, 2015

(87) PCT Pub. No.: WO2014/073327
PCT Pub. Date: May 15, 2014

(65) Prior Publication Data
US 2015/0299452 A1    Oct. 22, 2015

(30) Foreign Application Priority Data
Nov. 9, 2012    (JP) ................................ 2012-247481

(51) Int. Cl.
| | | |
|---|---|---|
| *C08K 3/04* | (2006.01) | |
| *C08L 63/00* | (2006.01) | |
| *C08K 5/14* | (2006.01) | |
| *C08L 33/04* | (2006.01) | |
| *C08L 93/00* | (2006.01) | |
| *C08L 33/14* | (2006.01) | |
| *C08L 33/06* | (2006.01) | |

(52) U.S. Cl.
CPC . *C08L 33/14* (2013.01); *C08K 3/04* (2013.01); *C08K 5/14* (2013.01); *C08L 33/068* (2013.01); *C08L 63/00* (2013.01); *C08K 2201/003* (2013.01); *C08K 2201/014* (2013.01); *C08L 2201/02* (2013.01); *C08L 2312/00* (2013.01)

(58) Field of Classification Search
CPC .............................. C08L 33/14; C08L 2201/02
USPC ................ 525/107, 330.3, 387; 524/366, 495
See application file for complete search history.

(56) References Cited

FOREIGN PATENT DOCUMENTS

| | | | | |
|---|---|---|---|---|
| JP | 2005-187772 | | | 7/2005 |
| JP | 2008-120928 | | | 5/2008 |
| JP | 2008120928 | A | * | 5/2008 |
| JP | 4503579 | | | 7/2010 |
| JP | 2011-006509 | | | 1/2011 |
| JP | 2011006509 | A | * | 1/2011 |

* cited by examiner

*Primary Examiner* — Kelechi Egwim
(74) *Attorney, Agent, or Firm* — Grossman, Tucker, Perreault & Pfleger, PLLC

(57) ABSTRACT

A vibration damping material according to one aspect of the present invention comprises a composition as a main component, the composition being prepared by mixing based on 100 parts by weight of acrylic rubber, at least, in an external ratio, 0.01 to 15 parts by weight of organic peroxide that can crosslink between epoxy-based crosslinking points with each other, 25 to 50 parts by weight of carbon black having a mean particle diameter of 22 to 45 nm, and 15 to 35 parts by weight of carbon black having a mean particle diameter of 70 to 85 nm; and crosslinking crosslinking points in the acrylic rubber with each other through the organic peroxide.

8 Claims, No Drawings

VIBRATION DAMPING MATERIAL

CROSS-REFERENCE TO RELATED APPLICATIONS

This international application claims the benefit of priority based upon the Japanese Patent Application No. 2012-247481, filed with Japanese Patent Office on Nov. 9, 2012, the entire disclosure of which is incorporated herein by reference.

TECHNICAL FIELD

The present invention relates to a vibration damping material.

BACKGROUND ART

The applicant of the present application has proposed a vibration damping material composed mainly of a composition prepared by the following method as a vibration damping material having excellent heat resistance and vibration-damping properties (see, for example, Patent Literature 1). Specifically, at least one monomer selected from alkyl acrylate, alkoxyalkyl acrylate, alkyl methacrylate, and alkoxyalkyl methacrylate is polymerized with a monomer that serves as an epoxy-based crosslinking point. 100 parts by weight of acrylic rubber having a molecular structure formed by the polymerization is mixed with, in an external ratio, 0.01 to 15 parts by weight of organic peroxide that crosslinks the epoxy-based crosslinking points with each other, 1 to one hundred parts by weight of tackifying resin, and 1 to 20 parts by weight of a plasticizer. Further, the composition is formed by crosslinking between the crosslinking points of the acrylic rubber with each other through the organic peroxide.

Since the vibration damping material described in Patent Document 1 is a vibration damping material that exhibits a loss coefficient (tan δ) of one or more that is different from the conventional acrylic rubber-based vibration damping material, the effect of exerting excellent vibration-damping properties equivalent to or superior to that in the butyl rubber-based vibration damping material can be attained.

Further, unlike the conventional butyl rubber-based vibration damping material, the vibration damping material has a low compression permanent strain even under temperatures above 100° C. and therefore exerts an effect of having heat resistance superior to that of the butyl rubber-based vibration damping material. Hence, the vibration damping material can be utilized in environments that are likely to be high temperature, for example, in an engine room of automobiles or the like.

In addition, the vibration damping material is manufactured at a lower cost than silicone rubber, fluoro-rubber, or the like and therefore exerts an effect that a final product can be provided at low price. Further, unlike silicone rubber, the vibration damping material is not a cause of electric contact fault such as a rise in contact resistance or a contact defect and therefore provides an effect that the vibration damping material can be used in electrical apparatuses and electronic apparatuses.

PRIOR ART DOCUMENTS

Patent Documents

Patent Document 1: Japanese Patent No. 4503579

SUMMARY OF THE INVENTION

Problems to be Solved by the Invention

The vibration damping material described in Patent Document 1 is a relatively soft material (hardness specified in JIS K 6253: approximately A32) and therefore may cause the following problem: when the vibration damping material is utilized in an application with a large load, such as in use as an underlay of heavy load, the vibration damping material hardly exerts its vibration-damping properties sufficiently due to reaching to bottom or the like.

To overcome the above problem, when only a mere increase in hardness of the material is required, the hardness of the material can be increased by various techniques. In general, however, such a kind of the rubber-based material tends to cause a decrease in vibration-damping properties due to an increase in repulsive elastic modulus with an increase in hardness.

Hence, in the vibration damping material, a mere unnecessary increase in hardness of the material may impair inherent functionality of high vibration-damping properties. This matter is also mentioned in paragraph [0018] in Patent Document 1 that an excessively high hardness of a finally obtained vibration damping material poses a problem.

Under such background, the present inventors have made repeated studies on a technique to improve the properties of the vibration damping material to make the vibration damping material usable in an application where a larger load is applied, while maintaining excellent vibration-damping properties of the vibration damping material. As a result, the present inventors have found that mixing of specific components at a specific mixing ratio can lead to an improvement while simultaneously maintaining a high level of vibration-damping properties and a sufficient hardness, and has completed the present invention.

In one aspect of the present invention, a vibration damping material that simultaneously has high heat resistance properties, excellent vibration-damping properties, and high load bearing properties can be desirably provided.

Means for Solving the Problems

The vibration damping material according to a first aspect of the present invention is a material including a composition as a main component, the composition being prepared by mixing, based on 100 parts by weight of acrylic rubber, at least, in an external ratio, 0.01 to 15 parts by weight of organic peroxide that crosslinks between epoxy-based crosslinking points with each other, 25 to 50 parts by weight of carbon black having a mean particle diameter of 22 to 45 nm, and 15 to 35 parts by weight of carbon black having a mean particle diameter of 70 to 85 nm; and crosslinking between crosslinking points in the acrylic rubber with each other through the organic peroxide.

The vibration damping material according to a second aspect of the present invention is a material including a composition as a main component, the composition being prepared by mixing, based on 100 parts by weight of acrylic rubber that is a polymer of at least one monomer selected from alkyl acrylate, alkoxyalkyl acrylate, alkyl methacrylate, and alkoxyalkyl methacrylate and a monomer that serves as an epoxy-based crosslinking point, in an external ratio, 0.01 to 15 parts by weight of organic peroxide that can crosslink between the epoxy-based crosslinking points with each other, 1 to 100 parts by weight of tackifying resin, 1 to 20 parts by weight of plasticizer, 25 to 50 parts by weight of carbon black having a mean particle diameter of 22 to 45 nm, and 15 to 35 parts by weight of carbon black having a mean particle diameter of 70 to 85 nm; and crosslinking the crosslinking points in the acrylic rubber with each other through the organic peroxide.

In the vibration damping material, a polymer of at least one monomer selected from alkyl acrylate, alkoxyalkyl acrylate, alkyl methacrylate, and alkoxyalkyl methacrylate and a monomer that serves as an epoxy-based crosslinking points may be used as the acrylic rubber that is a starting material.

As an alkyl acrylate, one having an alkyl group with 1 to 8 carbon atoms (preferably 1 to 4 carbon atoms, more preferably 1 or 2 carbon atoms, particularly preferably 2 carbon atoms) may be used. More specifically, examples of the usable alkyl acrylate include methyl acrylate, ethyl acrylate, n-propyl acrylate, isopropyl acrylate, n-butyl acrylate, isobutyl acrylate, pentyl acrylate, hexyl acrylate, heptyl acrylate, and octyl acrylate.

Examples of the usable alkoxyalkyl acrylate include alkoxyalkyl acrylates in which the alkoxy group and the alkylene group have 1 to 4 carbon atoms. More specifically, examples of the usable alkoxyalkyl acrylate include methoxymethyl acrylate, methoxyethyl acrylate, methoxypropyl acrylate, ethoxymethyl acrylate, ethoxyethyl acrylate, ethoxypropyl acrylate, and butoxyethyl acrylate. Among them, methoxymethyl acrylate and methoxyethyl acrylate are preferred.

Examples of the usable alkyl methacrylate include alkyl methacrylates in which the alkyl group has 1 to 8 carbon atoms (preferably 1 to 4 carbon atoms, more preferably 1 or 2 carbon atoms, and particularly preferably 2 carbon atoms). Specifically, examples of the usable alkyl methacrylate include methyl methacrylate, ethyl methacrylate, n-propyl methacrylate, isopropyl methacrylate, n-butyl methacrylate, isobutyl methacrylate, pentyl methacrylate, hexyl methacrylate, heptyl methacrylate, and octyl methacrylate.

Examples of the usable alkoxyalkyl methacrylate include alkoxyalkyl methacrylates in which the alkoxy group has 1 to 4 carbon atoms and alkoxyalkyl methacrylates in which the alkylene group has 1 to 4 carbon atoms. Specifically, examples of the usable alkoxyalkyl methacrylate include methoxymethyl methacrylate, methoxyethyl methacrylate, methoxypropyl methacrylate, ethoxymethyl methacrylate, ethoxyethyl methacrylate, ethoxypropyl methacrylate, and butoxyethyl methacrylate. Among them, methoxymethyl methacrylate and methoxyethyl methacrylate are preferred.

One of these alkyl acrylate, alkoxyalkyl acrylate, alkyl methacrylate, and alkoxyalkyl methacrylate may be used solely or two or more of them may be blended to be used.

Examples of the usable monomer that serves as a usable epoxy-based crosslinking point include unsaturated glycidyl esters (for example, glycidyl acrylate, glycidyl methacrylate, itaconic acid diglycidyl ester, butene tricarboxylic acid triglycidyl ester, and p-styrenecarboxylic acid glycidyl ester), and unsaturated glycidyl ethers (for example, vinyl glycidyl ether, allyl glycidyl ether, and methacryl glycidyl ether). Among them, glycidyl acrylate and glycidyl methacrylate are preferred. One of these monomers that serve as epoxy-based crosslinking points may be used solely or two or more of them may be blended to be used.

The usable organic peroxide may include at least one organic peroxide selected from di-t-butyl peroxide, t-butyl cumyl peroxide, dicumyl peroxide, α,α-bis(t-butylperoxyisopropyl)benzene, 2,5-dimethyl-2,5-di(t-butylperoxy)hexane, 2,5-dimethyl-2,5-di(t-butylperoxy)hexyne-3, 1,1-bis(t-butylperoxy)-3,3,5-trimethylcyclohexane, n-butyl-4,4-bis(t-butylperoxy)valerate, 2,2-bis(t-butylperoxy)butane, and 2,2-bis(t-butylperoxy)octane. Among them, α,α-bis(t-butylperoxyisopropyl)benzene is preferred.

One of these organic peroxides may be used solely or two or more of them may be blended to be used. The mixing amount of the organic peroxide is 0.01 to 15 parts by weight based on 100 parts by weight of the acrylic rubber. When the mixing amount of the organic peroxide is less than 0.01 parts by weight, sufficient crosslinking is not formed, a problem such as a lowered physical strength of a finally obtained vibration damping material may occur. On the other hand, when the mixing amount of the organic peroxide is more than 15 parts by weight, a problem such as an excessively high hardness of a finally obtained vibration damping material may occur due to excessive crosslinking.

In the present invention, a publicly known crosslinking aid may be used for improving crosslinking efficiency in vulcanization by the organic peroxide. Examples of such a publicly known crosslinking aid include p,p'-dibenzoylquinonedioxime, quinonedioxime, triallyl cyanurate, ethylene dimethacrylate, N,N'-m-phenylene bismaleimide, triallyl isocyanurate, and trimethylolpropane trimethacrylate.

The usable tackifying resin may include at least one resin selected from rosin resin, terpene resin, petroleum resin, coal resin, phenolic resin, and xylene resin. Among them, petroleum resin is preferred.

Examples of the usable rosin resin include glycerin and pentaerythritol esters of gum rosin, tall oil rosin, wood rosin, hydrogenated rosin, disproportionated rosin, polymerized rosin, and modified rosin.

Examples of the usable terpene resin include α-pinene-based terpene resin, β-pinene-based terpene resin, dipentene-based terpene resin, aromatic modified terpene resin, terpene phenolic resin, and hydrogenated terpene resin.

Examples of usable petroleum resin include aliphatic system petroleum resin, aromatic petroleum resin, copolymerization system petroleum resin, alicyclic (hydrogenated and dicyclopentadiene (DCPD) based) petroleum resin, and styrenic (styrenic and substituted styrenic) petroleum resin. Among them, aromatic petroleum resin is preferred. For example, $C_8$ to $C_{10}$ aromatic hydrocarbon distillate polymers are suitable.

Examples of usable coal resin include coumarone indene resin. Any one of these tackifying resins (rosin resin, terpene resin, petroleum resin, coal resin, phenolic resin, and xylene resin) may be used solely or two or more of them may be blended to be used.

The mixing amount of the tackifying resin is 1 to 100 parts by weight based on 100 parts by weight of the acrylic rubber. When the mixing amount of the tackifying resin is less than one part by weight, satisfactory vibration-damping properties are not likely to be obtained. On the other hand, when the mixing amount of the tackifying resin is more than 100 parts by weight, a significant improvement in vibration-damping properties cannot be expected. On the contrary, mixing of an excessive amount of the tackifying resin may adversely affect other properties.

Examples of the usable plasticizer include fatty oil-based softening agents (for example, stearic acid, lauric acid, ricinoleic acid, palmitic acid, other fatty acids, and salts of these various fatty acids; cotton seed oil; soybean oil; castor oil;

peanut oil; palm oil; coconut oil; pine oil; pine tar oil; rosins; tall oil; and factice), mineral oil-based softening agents (for example, aromatic oil, naphthene-based oil, and paraffinic oil), phthalate ester-based plasticizers (for example, dibutyl phthalate (DBP), dioctyl phthalate (DOP)), aliphatic dibasic acid ester-based plasticizers (for example, dioctyl adipate (DOA), dioctyl sebacate (DOS), and dibutyl sebacate (DBS)), aromatic polycarboxylic acid ester-based plasticizers (for example, trioctyl trimellicate (TOTM) and tridecyl trimellicate (TDTM)), epoxy-based plasticizers (for example, epoxidized soybean oil, and epoxidized linseed oil), phosphoric ester-based plasticizers (for example, tricresyl phosphate and trioctyl phosphate), ether-based plasticizers (for example, dibutyl carbitol adipate and dibutyl carbitol formal), and polyester-based plasticizers (for example, adipic acid polyester and sebacic acid polyester). Among them, polyester-based plasticizers are preferred. For example, adipic acid polyester is suitable.

Any one of these plasticizers may be used solely or two or more of them may be blended to be used. The mixing amount of the plasticizer is 1 to 20 parts by weight based on 100 parts by weight of the acrylic rubber. When the mixing amount of the plasticizer is less than one part by weight, an effect attained by the addition of the plasticizer is so small that, for example, a problem of an excessively high increase in hardness of a finally obtained vibration damping material may occur. When the mixing amount of the plasticizer is less than 20 parts by weight, there is a tendency towards leaching (bleeding) of the plasticizer from a surface of the finally obtained vibration damping material.

For the carbon black, mixing of at least two kinds of carbon black having different mean particle diameters into the composition is important. Specifically, in the present invention, based on findings experimentally confirmed by the present inventors, 25 to 50 parts by weight of carbon black having a mean particle diameter of 22 to 45 nm and 15 to 35 parts by weight of carbon black having a mean particle diameter of 70 to 85 nm are mixed with the composition. Further, mixing of three or more kinds of carbon blacks different from each other in mean particle diameter poses no problem as long as the properties of a finally obtained vibration damping material are not sacrificed.

When the carbon black is not mixed with the composition, the hardness cannot be sufficiently enhanced without difficulties. Further, when only one kind of carbon black is mixed, mixing in a small amount makes it difficult to sufficiently enhance the hardness. On the other hand, when the mixing amount is large, the hardness is increased but, on the other hand, the repulsive elastic modulus is also enhanced, resulting in lowered vibration-damping properties.

The present inventors have experimentally confirmed the fact that the introduction of a plurality of different kinds of carbons having different mean particle diameters can enhance the hardness of the material while maintaining a low repulsive elastic modulus. The reason for the fact has not yet been elucidated by the present inventors but is considered as follows. Specifically, when particles having a small particle diameter and particles having a large particle diameter are present together, the particles are dispersed in such a manner that small particles enter into between large particles. Thus, there is a possibility that some favorable effect on the dispersibility of carbon black in a base material contributes to an improvement in properties of the vibration damping material. Alternatively, some difference in properties is observed between large particles and small particles. Thus, when both a component having good compatibility with large particles and a component having good compatibility with small particles are contained, the properties of the vibration damping material are possibly improved over those in the case where only any one of the two kinds of particles is mixed. Alternatively, the improvement may be achieved by some other reasons. In any event, unlike the case where the mixing amount of a single kind of carbon black is merely increased, an improvement can be provided while simultaneously realizing a low repulsive elastic modulus and a sufficient hardness.

The vibration damping material of the present invention should contain the above main component. However, components other than the main component may be contained in the vibration damping material as long as the intended various properties (vibration-damping properties, hardness, and compression properties) are not sacrificed. Components other than the main component include, for example, lubricant, processing aid, crosslinking aid, and antioxidant (age inhibitor). Further, if necessary, various other compounding agents for rubber (for example, anti-scorching agent (scorch inhibitor), ultraviolet absorber, flame retardant, colorant, oil resistance improver, and foaming agent) may be added.

Further, an antioxidant (oxidation inhibitor) or an corrosion preventive agent (corrosion inhibitor) is desirably mixed when the vibration damping material of the present invention is used in contact with a material that is likely to be oxidized/corroded, such as a metal plate. In particular, benzotriazole-based compounds may be added as the antioxidant (oxidation inhibitor) or the corrosion preventive agent (corrosion inhibitor). The addition amount is preferably 0.01 to 10 parts by weight, more preferably 0.5 to 1.0 parts by weight. In case benzotriazole-based compounds are added as the antioxidant (oxidation inhibitor) or the corrosion preventive agent (corrosion inhibitor), even when the vibration damping material of the present invention is pressure-bonded to a clean metal surface, occurrence of a change in color of the metal surface is suppressed. In particular, even when a member such as a copper plate, which is relatively likely to undergo a change in color, is fabricated into a product form to which the vibration damping material of the present invention is pressure-bonded, the change in color of the copper plate can be suppressed.

Among the components included in the vibration damping material of the present invention above explained, the acrylic rubber can be produced by copolymerizing the above several monomers by a conventional method. The monomer mixture is copolymerized, for example, by emulsion polymerization, suspension polymerization, bulk polymerization, or solution polymerization (industrially preferably emulsion polymerization) at a temperature of approximately −100 to 200° C. (preferably 0 to 60° C.) in the presence of a radical polymerization initiator. When a predetermined polymerization conversion is achieved, a reaction-terminating agent is added to stop the polymerization reaction. Unreacted monomers are removed from the resultant latex, for example, by steam distillation. Thereafter, an antioxidant (age inhibitor) is added to this system, and this system is then brought into contact with an aqueous metal salt solution (for example, aluminum sulfate, calcium chloride, sodium chloride, and ammonium sulfate) to coagulate the system. The resultant coagulation is dried to obtain acrylic rubber.

The acrylic rubber thus obtained and other components (organic peroxide, tackifying resin, plasticizer, and two kinds of carbon black) are introduced into general rubber kneading apparatus (for example, a roll-type kneading machine and a closed kneading machine) followed by homogeneous kneading. In this case, the tackifying resin is sometimes adhered on an inner surface of the apparatus before other components are sufficiently kneaded. For this reason, preferably, components other than the tackifying resin are previously kneaded and, after softening of these components, the tackifying resin is introduced.

In order to homogeneously knead the tackifying resin, preferably, kneading is carried out at a temperature above the softening point of at least the tackifying resin. The softening point of the tackifying resin varies depending upon the kind of the tackifying resin and thus cannot be identified by a numerical value. However, when the tackifying resin to be used is determined, the softening point of the tackifying resin can be identified, for example, by a softening point testing method specified in JIS K 2207 standard. For example, when the softening point of the tackifying resin has been found to be about 100° C. by the above testing method, the kneading may be carried out at a temperature somewhat above 100° C. (for example, about 105° C. or above).

Preferably, the temperature condition of the kneading is high to some extent from the viewpoint of lowering the viscosity of the kneaded object. However, an excessively high temperature is likely to cause scorching. The scorching leads to an increase in viscosity. Thus, the kneading is desirably carried out at or below temperature that does not cause an increase in viscosity.

Specifically, the temperature condition of the kneading is preferably set in a numerical range that is equal to or above the softening point of the tackifying resin and equal to or below the temperature at which an increase in viscosity involved in scorching occurs. In particular, the temperature condition is set at a temperature at which the viscosity is the lowest in the numerical range.

In addition, as described above, the softening point of the tackifying resin varies depending upon of the kind of the tackifying resin. When the softening point of the tackifying resin to be mixed is higher, the vibration damping property exhibition temperature is shifted to a higher temperature. When the softening point of the tackifying resin to be mixed is lower, the vibration damping property exhibition temperature is shifted to a lower temperature.

Hence, the vibration damping property exhibition temperature can be optimized by, after the determination of a target temperature at which the vibration damping property is to be exhibited according to a contemplated application of the final product, selecting a tackifying resin to be mixed while taking into consideration the softening point of the tackifying resin according to the target temperature. That is, since the vibration damping material of the present invention contains the tackifying resin, the vibration damping property exhibition temperature can easily be optimized.

The vibration damping material of the present invention having the above constitution is a vibration damping material having a loss coefficient (tan δ) of one or more that is different from conventional acrylic rubber-based vibration damping materials, and, thus, vibration-damping properties equal to or superior to those of butyl rubber-based vibration damping materials can be exerted. Further, unlike conventional butyl rubber-based vibration damping materials, the vibration damping material of the present invention has a low compression permanent strain even at a temperature condition above 100° C. Thus, the vibration damping material of the present invention is superior in heat resistance to butyl rubber-based vibration damping materials. Therefore, for example, the vibration damping material of the present invention can also be used in an engine room of automobile or in other environments that are easily brought to a high temperature. In addition, the production cost that is lower than silicone rubber or fluoro-rubber can provide a final product at a low cost. Like silicone rubber, the vibration damping material of the present invention does not cause electric contact fault such as a rise in contact resistance or a contact defect and therefore can be utilized in electrical apparatuses and electronic apparatuses. Further, mixing of 25 to 50 parts by weight of carbon black having a mean particle diameter of 22 to 45 nm and 15 to 35 parts by weight of carbon black having a mean particle diameter of 70 to 85 nm can realize an enhanced hardness while maintaining a low repulsive elastic modulus. Thus, when the vibration damping material is utilized in an application with a large load such as an underlay of heavy load, reaching to bottom or the like is less likely to occur. Therefore, vibration-damping properties can be sufficiently exerted.

MODE FOR CARRYING OUT THE INVENTION

Next, embodiments of the present invention will be described by taking an example.

[1] FIRST EMBODIMENT

Manufacturing Example of Vibration Damping Material 100 parts by weight of acrylic rubber (alkoxyalkyl acrylate/glycidyl acrylate polymer), 20 parts by weight of aromatic petroleum resin ($C_8$ to $C_{10}$ aromatic hydrocarbon distillate polymer), 5 parts by weight of polyester plasticizer (an adipic acid-based polyester), 38 parts by weight of carbon black having a mean particle diameter of 45 nm, 25 parts by weight of carbon black having a mean particle diameter of 78 nm, and other components (small amounts of antioxidant (oxidation inhibitor), lubricant, release agent, anti-aging agent (age inhibitor), and the like) were charged into a pressure kneader and were then kneaded at 110° C. for 5 minutes.

The composition prepared by kneading in the pressure kneader was transferred to a mixing roll kept at 60° C., and then 2 parts by weight of organic peroxide-based crosslinking agent (α,α-bis(t-butylperoxyisopropyl)benzene), and 6 parts by weight of maleimide-based crosslinking aid (N,N'-m-phenylenebismaleimide) were added to the composition. The mixture was kneaded for 5 minutes and then was divided into pieces, each of which has a thickness of about 5 mm, for easy sheet forming. Thereafter, a desired rubber sheet was obtained by mold clamping and crosslinking at 170° C. for 10 minutes with a press molding machine for rubber.

[Hardness Test]

The rubber sheet manufactured by the above manufacturing example was subjected to a hardness test with a type-A durometer according to a testing method specified in JIS K 6253. In the measurement, two rubber sheets having a thickness of 3 mm were stacked on each other. Measuring points were selected on a flat and smooth surface of the rubber sheet at positions distant by 12 mm or more from the end of the rubber sheet. The number of measuring points was five, and the measuring time was an instantaneous value. Measurement was carried out five times in such a manner that a contact point of a push needle was located at a position distant by 6 mm or more. The median was regarded as the hardness. As a result of the measurement, the hardness of the rubber sheet was found to be A53±5.

[Repulsive Elastic Modulus Test]

The repulsive elastic modulus of the rubber sheet manufactured by the above manufacturing example was measured with a Lubke repulsive elastic modulus testing machine according to a testing method specified in JIS K 6255. In the measurement, a test piece having a size of 29 mm in diameter×12.5 mm in thickness was provided. The median of measured values in the three tests was regarded as a repulsive height, and the repulsive elastic modulus was determined by calculation. A standard provision of the testing standards specifies that the test piece holding force is set to 200N±20N. Since, however, the vibration damping material according to the present invention is easily deformed, the test piece is deformed by the above-described holding force. Therefore test piece holding force was set to 29N to 39N. As a result of the measurement, the repulsive elastic modulus was found to be 7%.

[Comparative Test]

For comparison, a rubber sheet was experimentally manufactured under quite the same conditions as in the above manufacturing example, except that the carbon black used was only one having a mean particle diameter of 78 nm. Subsequently, a hardness test and a repulsive elastic modulus test were carried out in the same manner as described above. As a result of the measurement, the hardness and the repulsive elastic modulus were about A32 and 7%, respectively.

From the results of the measurement, it is found that the combined use of carbon black having a mean particle diameter of 45 nm and carbon black having a mean particle diameter of 78 nm can realize a higher hardness of vibration damping materials while maintaining a low repulsive elastic modulus.

[2] SECOND EMBODIMENT

A rubber sheet was experimentally manufactured under quite the same conditions as in the first embodiment, except that, while in the first embodiment, the amount of the carbon black having a mean particle diameter of 45 nm mixed was 38 parts by weight, any one of or both the mean particle diameter and the mixing amount were changed as specified in Table 1 below, and mixing of 25 parts by weight of carbon black having a mean particle diameter of 78 nm remained unchanged. In the same manner as described above, the hardness test and the repulsive elastic modulus test were carried out. The results of the measurement are also described in Table 1 below.

material can be enhanced while maintaining the low repulsive elastic modulus.

On the other hand, when the mean particle diameter of the carbon black mixed was 62 nm, 72 nm, 80 nm, and 120 nm, the hardness and the repulsive elastic modulus were A45 to A68 and 14 to 22%, respectively. The rubber sheet experimentally manufactured in the comparative test in the first embodiment had a hardness of approximately A32. Thus, in all the examples, the hardness was somewhat higher. However, the repulsive elastic modulus was enhanced to a two-digit figure. Thus, the low repulsive elastic modulus could not be maintained.

Thus, it is found that the combined use of carbon black having a mean particle diameter of 78 nm and carbon black having a mean particle diameter of 22 to 45 nm is important to enhance vibration-damping properties while lowering the repulsive elastic modulus. It is also found that expected properties cannot be obtained by the combined use of carbon black having a mean particle diameter of 78 nm and carbon black having a mean particle diameter of 62 to 120 nm.

In comparison among examples where carbon blacks having respective mean particle diameters of 22 nm, 28 nm, and 45 nm were mixed, when the mixing ratio is identical, the hardness enhances with reducing the mean particle diameter. Thus, when the necessary hardness is determined according to applications of the vibration damping material, the hardness can be regulated while maintaining the low repulsive elastic modulus by developing the mean particle diameter of the carbon black to be mixed according to the necessary hardness.

That is, in order to regulate the hardness, a method may be adopted in which the mixing amount of the carbon black can be increased. Mere relying on this only has a possibility that the repulsive elastic modulus increases with increasing the hardness. As described above, however, when the hardness can be regulated by selecting the mean particle diameter, the low repulsive elastic modulus can be maintained by suppressing an increase in the mixing amount of the carbon black.

TABLE 1

| | | No. | | | | | | | | | |
|---|---|---|---|---|---|---|---|---|---|---|---|
| | | 1 | 2 | 3 | 4 | 5 | 6 | 7 | 8 | 9 | 10 |
| Carbon black | Mean particle diameter (nm) | 22 | | 28 | | 45 | | 62 | 72 | 80 | 120 |
| | Specific surface area ($m^2/g$) | 124 | | 77 | | 40 | | 32 | 29 | 23 | 12 |
| | Parts by weight (phr) | 50 | 25 | 50 | 25 | 50 | 25 | 25 | 25 | 25 | 25 |
| Results of measurement | Hardness | A87 | A69 | A74 | A62 | A76 | A53 | A61 | A68 | A45 | A48 |
| | Repulsive elastic modulus (%) | 6 | 5 | 7 | 6 | 8 | 7 | 16 | 14 | 17 | 22 |

As can be seen from the results shown in Table 1 above, when the mean particle diameter of the carbon black mixed was 22 nm, 28 nm, and 45 nm, the hardness and the repulsive elastic modulus were A53 to A87 and 5 to 8%, respectively. Thus, in all examples, the hardness of the vibration damping

[3] THIRD EMBODIMENT

Rubber sheets were experimentally manufactured under the same conditions as in examples in the second embodiment where carbon blacks having respective mean particle diameters of 22 nm, 28 nm, and 45 nm were mixed, except that the mean particle diameter of the carbon black having a mean particle diameter of 78 nm mixed in an amount of 25 parts by weight was changed from 78 nm to 70 nm and in addition the mixing ratio of the carbon black was 15 parts by weight, 25 parts by weight, and 35 parts by weight (the other conditions remained unchanged). Further, rubber sheets were experimentally manufactured under the same conditions as described above, except that the mean particle diameter was changed from 78 nm to 85 nm and in addition the mixing ratio of the carbon black was 15 parts by weight, 25 parts by weight, and 35 parts by weight (the other conditions remained unchanged).

For these test pieces, a hardness test and a repulsive elastic modulus test were carried out in the same manner as described above. As with the above embodiments, a hardness of A50 or higher could be obtained. Further, the repulsive elastic modulus could be suppressed to less than 10%. Thus, as can be also seen from the results, the combined use of carbon black having a small mean particle diameter of approximately 22 to 45 nm and carbon black having a large mean particle diameter of approximately 70 to 85 nm can realize an improvement in rubber sheets while simultaneously realizing a low repulsive elastic modulus and a sufficient hardness.

[4] OTHER EMBODIMENTS

Although the embodiments of the present invention have been described, the present invention is not limited to these specific embodiments and various other embodiments can be carried out.

For example, in the above embodiments, examples where vibration damping materials are manufactured by combining some specific materials as indispensable components of the present invention are described. However, desired vibration damping materials can also be manufactured by using any material selected from a plurality of the above recited materials as the indispensable component.

What is claimed is:

1. A vibration damping material comprising a composition as a main component, the composition being prepared by mixing, based on 100 parts by weight of acrylic rubber that is a polymer of at least one monomer selected from alkyl acrylate, alkoxyalkyl acrylate, alkyl methacrylate, and alkoxyalkyl methacrylate and a monomer that serves as an epoxy-based crosslinking point, in an external ratio, 0.01 to 15 parts by weight of organic peroxide that can crosslink between epoxy-based crosslinking points with each other, 1 to 100 parts by weight of tackifying resin, 1 to 20 parts by weight of plasticizer, 25 to 50 parts by weight of carbon black having a mean particle diameter of 22 to 45 nm, and 15 to 35 parts by weight of carbon black having a mean particle diameter of 70 to 85 nm; and crosslinking crosslinking points in the acrylic rubber with each other through the organic peroxide.

2. The vibration damping material according to claim 1, wherein the organic peroxide is α,α-bis(t-butylperoxyisopropyl)benzene.

3. The vibration damping material according to claim 1, wherein the tackifying resin is a $C_8$ to $C_{10}$ aromatic hydrocarbon distillate polymer.

4. The vibration damping material according to claim 1, wherein the plasticizer is a polyester plasticizer.

5. The vibration damping material according to claim 2, wherein the tackifying resin is a $C_8$ to $C_{10}$ aromatic hydrocarbon distillate polymer.

6. The vibration damping material according to claim 2, wherein the plasticizer is a polyester plasticizer.

7. The vibration damping material according to claim 3, wherein the plasticizer is a polyester plasticizer.

8. The vibration damping material according to claim 5 wherein the plasticizer is a polyester plasticizer.

* * * * *